May 2, 1961 R. D. RUMSEY 2,982,537
TEMPERATURE COMPENSATED LIQUID-SPRING DEVICE
Filed Jan. 20, 1958
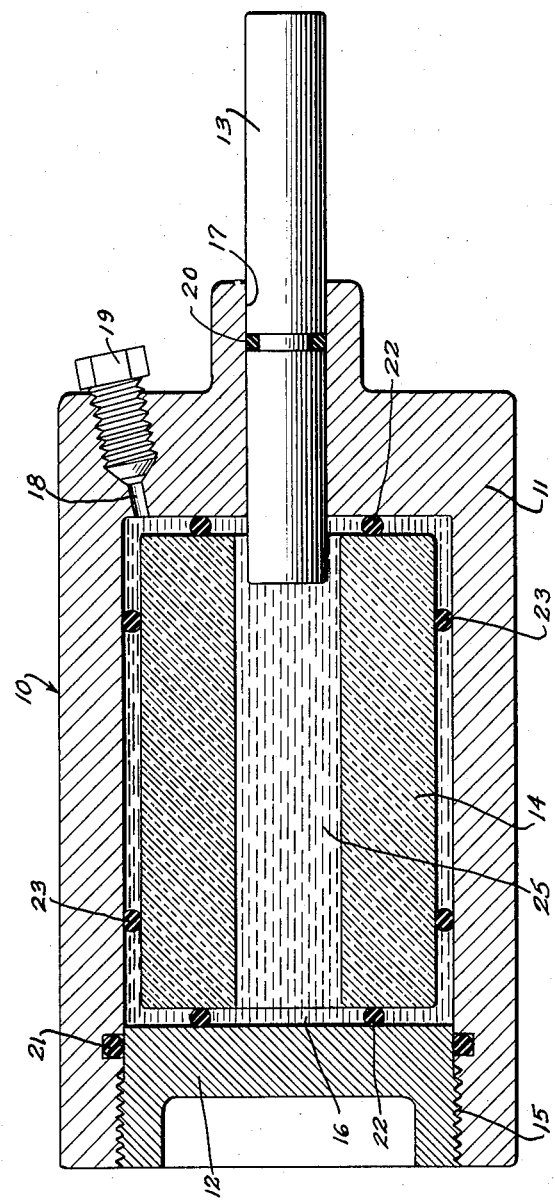
Inventor
ROLLIN DOUGLAS RUMSEY
by Hill, Sherman, Meroni, Gross & Simpson Attys.

United States Patent Office 2,982,537
Patented May 2, 1961

2,982,537

TEMPERATURE COMPENSATED LIQUID-SPRING DEVICE

Rollin Douglas Rumsey, Buffalo, N.Y., assignor to Houdaille Industries, Inc., Buffalo, N.Y., a corporation Filed Jan. 20, 1958, Ser. No. 709,863

3 Claims. (Cl. 267—1)

This invention relates generally to temperature compensation of liquid-filled devices, and more specifically to an improved temperature compensated liquid spring.

Although the principles of the present invention may be included in various liquid-filled devices, a particularly useful application is made in liquid-filled springs.

In particular, when liquid springs experience a reduction in temperature, heretofore known springs exhibit a loss in strength. This decrease results in a serious reduction in load absorption capabilities. Where the spring is employed with other mechanisms, such as in the recoil mechanism of a machine gun, the decrease in load absorption capability of the spring also can cause the machine gun or other device to malfunction.

The present invention contemplates the utilization of a temperature compensator in the liquid-filled device or spring which overcomes this disadvantages. A typical liquid spring includes a chamber defined by a housing, such chamber being completely filled with a compressible fluid, such as a silicone fluid. A piston is sealably carried by the housing and extends from the outside thereof into the chamber, so that when a force is applied to the piston on the outside, the fluid is thereby compressed and exerts a reactive force urging the piston in an outward direction.

When the spring is subjected to a temperature change, the confined fluid changes in volume at a rate somewhat faster than does the volume within the housing, which ordinarily is made of metal. Thus on a temperature increase, any preload on the spring is increased, while on a temperature decrease, the preload on the spring is relieved.

Accordingly, it is an object of the present invention to provide an improved liquid spring.

Another object of the present invention is to provide temperature compensation for a liquid spring.

Yet another object of the present invention is to provide temperature compensation for a device having a chamber which is completely filled with a liquid.

Many other advantages, features and additional objects of the present invention will become manifest to those versed in the art upon making reference to the detailed description and the accompanying drawing in which a preferred structural embodiment incorporating the principles of the present invention is shown by way of illustrative example.

On the drawing:

The figure is a cross-sectional view of a liquid spring assembly equipped with a temperature compensator provided in accordance with the principles of the present invention.

As shown on the drawing:

The principles of this invention are particularly useful when embodied in a liquid spring assembly such as illustrated by the drawing, generally indicated by the numeral 10. The liquid spring assembly 10 includes a housing 11 of steel, a housing cap 12, a piston 13, and a temperature compensator 14.

The housing 11 is made in a generally cup-shaped configuration and is provided with threads 15 at its mouth. The region intermediate the threads 15 and the bottom or interior of the housing 11 defines a chamber 16 which communicates with the open end at the threads 15 and with a cylinder bore 17 at the opposite end thereof. If desired, an additional passage 18 may be provided through the wall of the housing 11 for filling the chamber 16. The passage 18 may be closed by any convenient means such as a plug 19.

The cap 12 is externally threaded and is received in the threaded mouth of the housing 11. The axial position of the cap 12 may be used to vary the preload on the spring assembly 10. The cap 12 may be provided with any conventional means for rotatably engaging a tool, such means being well known and not illustrated in the instant drawing.

The piston 13 is reciprocably carried in the cylinder bore 17 of the housing 11, extending from the outside of the housing for engagement with a cooperating mechanism, and extending interiorally of the housing 11 into the chamber 16. A seal 20 may be provided in either of the piston 13 or the housing 11, and a similar seal 21 may be provided in one of the housing 11 and the cap 12 to prevent any liquid escape at the cap 12.

The temperature compensator 14 comprises an annular member of low expansion material. Any one of several different materials may be used as the member 14. Some examples of this includes quartz, Invar, Pyrex and other low expansion glasses, and certain fired rock sold commercially as "Alsimag" and "Lava A." It will be noted that several of these materials are brittle. Accordingly, means are preferably provided for supporting the compensator 14 in spaced relation to the interior wall of the housing 11 within the chamber 16. Where the compensator 14 is fragile, it is preferable that the supporting means not only support the compensator 14, but also cushion it against shocks. To this end, I have provided a plurality of resilient O-rings 22 and 23, the cap 12 cooperating with the rings 22 to restrain the compensator 14 in an axial direction, and the rings 23 cooperating with the housing 11 to restrain the compensator 14 in a radial direction.

As is customary in this type of device, the chamber 16 is filled with a compressible fluid such as a silicone fluid 25 so that there are no air pockets or voids anywhere within the chamber 16.

The operation of the device will now be considered. When a conventional liquid spring is subjected to a temperature increase, the fluid contained therein normally expands three to ten times as much as does the metal container. Thus a temperature increase or decrease materially affects the loading on the piston 13. In the instant invention, however, the size of the compensator 14 has been selected so as to offset the differential thermal expansion between chamber 11 and the liquid 25. If the material from which the compensator is made undergoes substantially no volumeric change during a temperature variation, then the increase in volume of the case must equal the increase in volume of the fluid. This result can be achieved by properly proportioning the relative volumes of the chambers, the liquid, and the compensator.

By way of example, if a given temperature change produces ten times as great a volumetric change for the liquid as it does for the container, if 90% of the container or chamber is filled with a constant volume material, then a volume of fluid one-tenth as great as the volume of the chamber will undergo the same volumetric change as the chamber. Of course, these figures are merely illustrative, and the exact proportions must be selected in view of the coefficients of thermal expansion of the liquid, of the chamber, and of the "constant" volume compensator, having in mind the temperature range for which compensation is to be achieved.

The chamber volume minus the compensator volume may be termed the effective chamber volume. Thus the effective chamber volume may vary with temperature substantially at the same rate as the liquid. When this result is achieved, there is no change in the force-deflection rate of the spring with temperature, there is no change in the preload of the spring, and the pressure within the chamber as well as the reactive force on the piston are substantially unaffected by temperature.

It is to be understood that the configuration of the temperature compensator 14 is entirely optional, and may be varied as may be convenient. Its principal quality is that of being of a material which is compatible with the fluid and which exhibits a smaller volumetric change as a result of thermal variations than does the housing 11.

The term housing as used herein includes the cap 12 as well as any other structure which defines the chamber.

It is apparent that this principle of temperature compensation may be applied to various liquid filled devices including the liquid springs such as shown in the patent to Taylor No. 2,708,109, issued May 10, 1955, and patent to Taylor No. 2,766,037. It is to be understood that these patents are listed for purpose of illustration and not of limitation.

Although various minor modifications might be suggested by those versed in the art, it should be understood that I wish to embody within the scope of the patent warranted hereon also such embodiments as reasonably and properly come within the scope of my contribution to the art.

I claim as my invention:

1. A liquid spring comprising a housing defining a sealed chamber, a piston sealably and reciprocably extending through said housing into said chamber, a compressible liquid completely filling said chamber for resiliently providing a force on said piston which is reactive to motion of said piston into said chamber, said liquid being capable of a greater volumetric change than said chamber in response to a temperature variation, and a tubular compensator always having a positive coefficient of expansion, said compensator being supported axially and radially within said liquid in telescopic relation with said piston and being capable of a lesser volumetric change than said chamber in response to said temperature variation, said means being so proportioned that said reactive force is substantially unaffected by temperature change.

2. In a liquid spring including a housing having inner walls defining a sealed chamber, a piston sealably and reciprocably extending through said housing into said chamber, a compressible liquid completely filling said chamber and held thereby under pressure in a compressed state for resiliently providing a force on said piston which is reactive to motion of said piston into said chamber, said liquid being capable of a greater volumetric change than said chamber in response to a variation of the temperature thereof, the improvement of: a fragile tubular compensator always having a small positive coefficent of expansion of such magnitude as to have a substantially constant volume and being capable of a lesser volumetric change than said chamber in response to said variation of temperature, and resilient means disposed axially and radially intermediate said compensator and said housing walls, said means supporting said compensator in said liquid in telescopic relation with said piston and in spaced relation to said walls and said piston, the volume of said compensator being so proportioned with respect to the volume of said chamber that the force-deflection rate of said spring, said pressure within said chamber, and said reactive force are substantially unaffected by both elevated and reduced temperatures of said spring.

3. In a liquid spring including a housing having inner walls defining a sealed chamber, a piston sealably and reciprocably extending through said housing into said chamber, a compressible liquid completely filling said chamber and adapted to be held thereby under pressure in a compressed state for resiliently providing a force on said piston which is reactive to any motion of said piston into said chamber, said liquid being capable of a greater volumetric change than said chamber in response to a variation of the temperature thereof, the improvement of: a fragile compensator always having a small positive coefficient of expansion of such magnitude as to have a substantially constant volume and being capable of a lesser volumetric change than said chamber in response to said variation of temperature, and resilient means disposed intermediate said compensator and said housing, said means supporting said compensator in said liquid in spaced relation to any position of said piston, the volume of said compensator being so proportioned with respect to the volume of said chamber that the force-deflection rate of said spring, said pressure within said chamber, and said reactive force are substantially unaffected by both elevated and reduced temperatures of said spring.

References Cited in the file of this patent

UNITED STATES PATENTS

| 2,560,005 | Shawbrook et al. | July 10, 1951 |
| 2,711,313 | Zumwalt | June 21, 1955 |

FOREIGN PATENTS

| 526,378 | France | June 30, 1921 |
| 759,423 | Great Britain | Oct. 17, 1956 |